Figure 1:
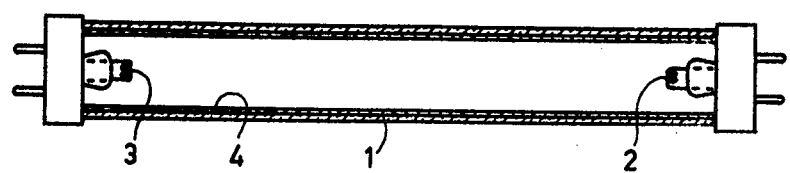

United States Patent [19]

Verriet et al.

[11] 4,093,890

[45] June 6, 1978

[54] TERBIUM-ACTIVATED LUMINESCENT GARNET MATERIAL AND MERCURY VAPOR DISCHARGE LAMP CONTAINING THE SAME

[75] Inventors: Johannes Gerardus Verriet; Antonius Maria Josephus Hubertus Seuter, both of Eindhoven, Netherlands

[73] Assignee: U.S. Philips Corporation, New York, N.Y.

[21] Appl. No.: 795,009

[22] Filed: May 9, 1977

[30] Foreign Application Priority Data

May 13, 1976  Netherlands .......................... 7605094

[51] Int. Cl.$^2$ ............................................. C09K 11/46
[52] U.S. Cl. .............................. 313/486; 252/301.4 R; 252/301.4 F; 252/301.6 R; 252/301.6 F
[58] Field of Search .................. 252/301.4 R, 301.4 F, 252/301.6 R, 301.6 F; 313/486

[56] References Cited

U.S. PATENT DOCUMENTS

| 3,544,479 | 12/1970 | Datta .......................... 252/301.4 R X |
| 3,965,031 | 6/1976 | Klein et al. .................... 252/301.4 R |
| 4,026,816 | 5/1977 | Ranby et al. ............. 252/301.4 R X |

FOREIGN PATENT DOCUMENTS

| 46-32161 | 9/1971 | Japan ............................. 252/301.4 R |

OTHER PUBLICATIONS

Holloway et al. "Chem. Abstracts", vol. 65, 1966, 8209a.
Suwa et al "Chem. Abstracts", vol. 75, 1971, 55638t.
Blasse et al "Philips Research Reports"22 pp. 481–504, 1967.

*Primary Examiner*—Jack Cooper
*Attorney, Agent, or Firm*—Frank R. Trifari; Norman N. Spain

[57] ABSTRACT

Terbium-activated luminescent material with garnet crystal structure satisfying the formula

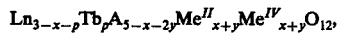

wherein Ln represents yttrium, gadolinium and/or lutecium, A aluminium and/or gallium, Me$^{II}$ magnesium, calcium, strontium and/or zinc, and Me$^{IV}$ silicon, germanium and/or zirconium, and wherein:

$0 \leq x \leq 2.8$ $0 \leq y \leq 2.0$ $0.4 \leq x+y \leq 2.8$ $0.02 \leq p \leq 1.50$ $x+p \leq 3.0$ is useful in low pressure mercury vapor discharge lamps.

8 Claims, 3 Drawing Figures

TERBIUM-ACTIVATED LUMINESCENT GARNET MATERIAL AND MERCURY VAPOR DISCHARGE LAMP CONTAINING THE SAME

The invention relates to a luminescent screen provided with a luminescent material with garnet crystal structure applied onto a support and activated by terbium. Furthermore the invention relates to a low pressure mercury vapour discharge lamp provided with such a luminescent screen and to the luminescent material itself.

It is known that the aluminates of yttrium and/or the rare earth metals with garnet crystal structure, for example yttrium aluminium garnet in accordance with the formula $Y_3Al_5O_{12}$, can be proper host lattices for activation by other rare earth metals. In such garnets the aluminium may be wholly or partly replaced by gallium. Said activation furnishes materials which efficiently luminesce when suitably excited. Known materials which are used as laser material are, for example, the garnets activated by praseodymium and/or neodymium. A known material which luminesces very efficiently when excited by a cathode ray is cerium-activated yttrium aluminate garnet (see Dutch patent application No. 6706095). In a publication by Blasse and Bril in Philips Research Reports 22, 481–504 (1967) mention is made of terbium-activated $Y_3Al_5O_{12}$ which can be excited with ultraviolet rays and which then furnishes the characteristic terbium emission desired for many purposes. A great disadvantage of the prior art terbium-activated garnet is that this material has a rather sharp excitation maximum at approximately 275 nm. On excitation by radiation having a wavelength of 254 nm a luminous flux is obtained which amounts to only approximately 10% of the luminous flux on excitation in the maximum of the excitationspectrum. Consequently, the material is not suitable for use in low pressure mercury vapour discharge lamps (mainly 254 nm - excitation).

It is known (see C.A. Vol. 75 (1971) abstract no. 55638 t), that in the compound $Y_3Al_5O_{12}$ the yttrium may be replaced wholly or partly by magnesium when a simultaneous substitution of a similar proportion of aluminium by silicon is made. It also appeared possible to replace the aluminium in such garnets by equiatomic quantities of magnesium and silicon. With this substitution the garnet structure of the material is retained.

It is an object of the invention to provide luminescent terbium-activated garnets which do not have the drawbacks of the above-mentioned prior art terbium-activate garnet and which can be applied with much advantage, for example in low pressure mercury vapour discharge lamps.

A luminescent screen according to the invention is provided with a terbium-activated luminescent material with garnet crystal structure which is applied on a support, and is characterized in that the luminescent material satisfies the formula.

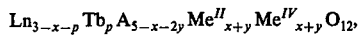

$$Ln_{3-x-p}Tb_p A_{5-x-2y}Me^{II}{}_{x+y}Me^{IV}{}_{x+y}O_{12},$$

wherein Ln represents at least one of the elements yttrium, gadolinium and lutecium, A at least one of the elements aluminium and gallium, wherein up to 40 mole % of the elements indicated by A may be replaced by scandium, $Me^{II}$ at least one of the elements magnesium, calcium, strontium and zinc, and $Me^{IV}$ at least one of the elements silicon, germanium and zirconium and wherein $0 \leq x \leq 2.8$ $0 \leq y \leq 2.0$ $0.4 \leq x+y \leq 2.8$
$0.02 \leq p \leq 1.50$
$x+p \leq 3.0$ A luminescent screen in accordance with the invention contains a luminescent garnet wherein the substitution $xLn+xA \rightarrow xMe^{II}+xMe^{IV}$, for example, $xY+xAl \rightarrow xMg+xSi$, or the substitution $2yA \rightarrow yMe^{II}+yMe^{IV}$, for example: $2yAl \rightarrow yMg+ySi$, or both substitutions have been performed. The degree in which these substitutions are performed is indicated by the parameters $x$ and $y$ respectively. It was surprisingly found that said substitutions result in considerable widening of the excitation band of the luminescent material. Consequently, the luminescent garnets according to the invention are excellently excited by the mercury-resonance-line at 254 nm. So it was not until the invention that it was possible to practically apply terbium-activated garnets in low pressure mercury vapour discharge lamps.

As appears from the above-mentioned general formula besides yttrium also gadolinium and/or lutecium may be chosen as the cation. It appeared that lanthanum is less suitable although small quantities (for example upto 10 mole % of Ln) do not disturb. The aluminium and/or gallium indicated by A can be replaced in the luminescent garnets according to the invention by scandium up to 40 mole %. The luminescent properties then change only to a very low degree. Larger quantities are not used because they are not absorbed in the lattice. It furthermore appeared that not only Mg and Si respectively are eligible as substituting elements. Besides Mg, Ca and/or Sr and/or Zn can also be used as bivalent substituents. Barium appeared to be unsuitable here although small quantities (for example upto 10 mole % of $Me^{II}$) do not disturb. Besides Si also Ge and Zr are eligible as tetravalent substituent.

The contents of the elements $Me^{II}$ and $Me^{IV}$ ($x+y$) should be at least 0.4 as otherwise too low an effect of the substitution on the excitation spectrum of the garnet is obtained. Values of $x$ exceeding 2.8 and values of $y$ exceeding 2.0 (as well as values of $x+y$ exceeding 2.8) are not used because such materials cannot or only with great difficulty be obtained by means of solid state reactions.

The terbium content $p$ of a luminescent garnet according to the invention may be chosen from the wide range indicated above. Values of $p$ smaller than 0.02 are not used because then the absorption of the exciting ultraviolet radiation is too low. With high values of $p$ concentration quenching occurs which causes the luminous flux to become smaller. Values of $p$ exceeding 1.50 are therefore not used.

For the element indicated in the general formula by Ln preference is given to yttrium because the highest luminous fluxes are obtained therewith.

Preference is given to aluminium as element A because the aluminium garnets yield very high luminous fluxes. In addition aluminium is considerably less expensive than gallium and scandium.

As bivalent substituent $Me^{II}$ magnesium is preferably used because this element furnishes the highest improvement as regards the absorption of 254 nm-radiation and consequently gives rise to high luminous fluxes.

An optimum absorption of 254 nm-radiation is also achieved if silicon is chosen for the tetravalent substituent $Me^{IV}$. Consequently the use of silicon is preferred.

Experiments have proved that the best results are obtained with luminescent garnets in accordance with the above-mentioned general formula if the parameters $x$, $y$ and $p$ are chosen in the ranges $$0.5 \leq x \leq 1.7$$

$$0 \leq y \leq 1.5$$

$$x+y \leq 2.25$$

$$0.05 \leq p \leq 0.75$$

more particularly in the ranges $$0.75 \leq x \leq 1.25$$

$$0 \leq y \leq 0.75$$

$$x+y \leq 1.75$$

$$0.10 \leq p \leq 0.50$$

These values of x, y and p are therefore preferred.

The luminescent garnets according to the invention can be used to great advantage in low pressure mercury vapour discharge lamps. For various applications, for example in photo copying equipment the green terbium radiation emitted by these lamps is greatly desired. Together with other luminescent materials the garnets according to the invention are also used in low pressure mercury vapour discharge lamps for general illumination.

The invention will now be described in greater detail with reference to a number of examples and measurements.

In the drawing

Figure 2:
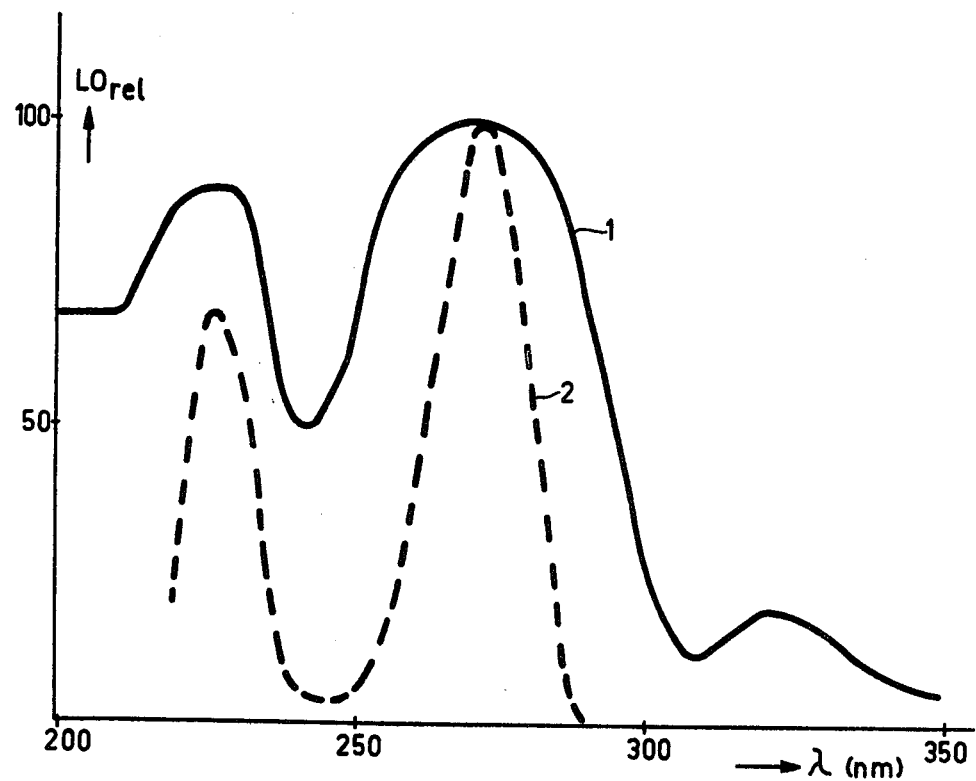
Figure 3:
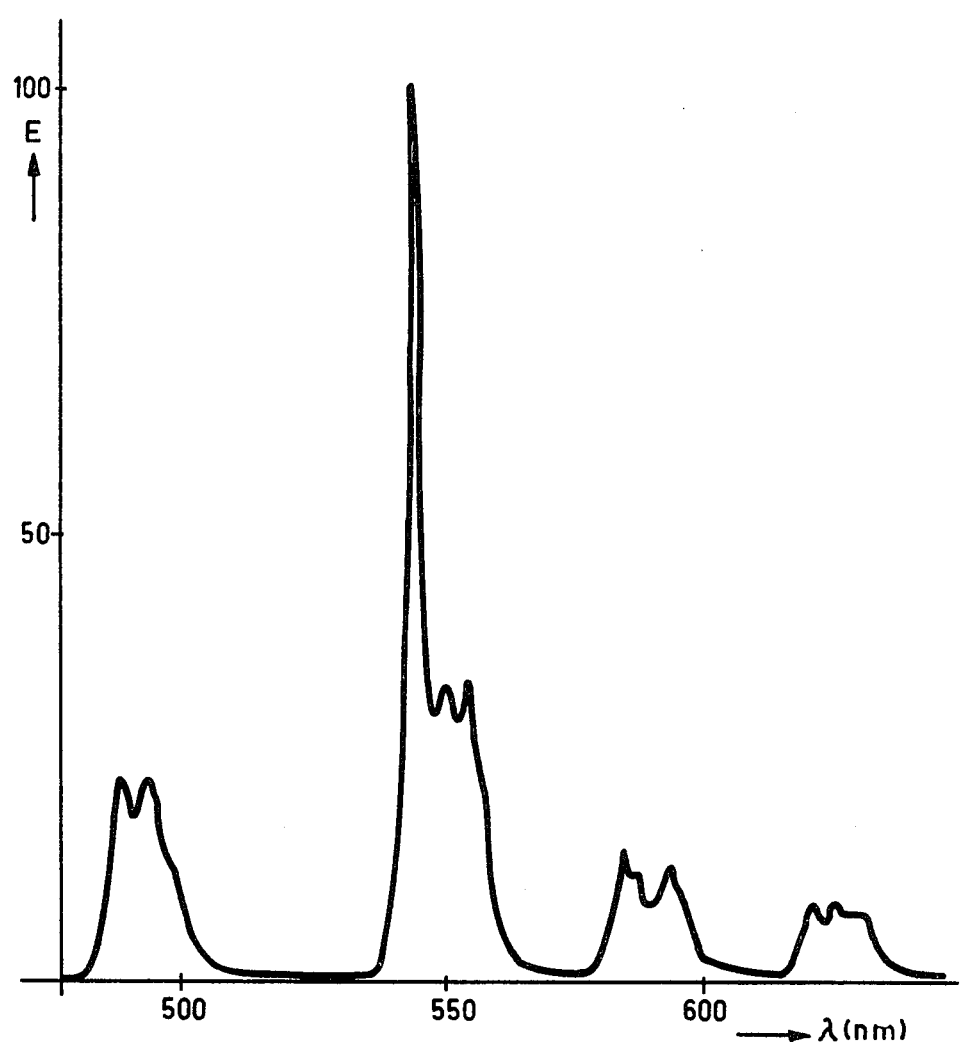

FIG. 1 shows diagrammatically and in crosssection a low pressure mercury vapour discharge lamp provided with a luminescent garnet according to the invention and FIG. 2 shows the excitation spectrum, and FIG. 3 the emission spectrum of a luminescent garnet according to the invention.

In FIG. 1 reference 1 is the glass wall of a low-pressure mercury vapour discharge lamp according to the invention. At the ends of the lamp electrodes 2 and 3 are disposed between which, on operation of the lamp, the discharge takes place. The lamp is provided with a rare gas mixture which serves as starting gas and, in addition, with a small quantity of mercury. On the inside the wall 1 is coated with a luminescent coating 5 which contains a luminescent garnet according to the invention. The luminescent coating 4 may be applied to the wall 1 in a customary manner, for example by means of a suspension containing the luminescent material.

The luminescent garnets according to the invention may be obtained by heating a mixture of the component oxides to a high temperature. It is also possible to start from compounds which furnish said oxides at an increase of the temperature, for example carbonates or hydroxides. It is usually advantageous to perform heating in two or more steps, wherein after each heating operation the product obtained is pulverized and homogenized. The heating steps usually occur at temperatures between 1000° and 1500° C in a neutral or weakly reducing atmosphere. When starting from carbonates or hydroxides the first heating operation may take place in air. This first heating operation may then be performed at a lower temperature, for example 700° C. Usually firing starts from mixtures which comprise the desired compounds in stoichiometric proportions. A slight excess of one or more of the constituents is, however, generally not disturbing and may even promote the reaction. In particular a relatively large excess of $Al_2O_3$ (for example upto 50%) can be used without objections.

EXAMPLE 1

A mixture is made of:
3.048 g. $Y_2O_3$
0.605 g. MgO
3.059 g. $Al_2O_3$
0.901 g. $SiO_2$
0.561 g. $Tb_4O_7$ This mixture is transferred to a sintered aluminia crucible which is then placed in a covered quartz dish. The quartz dish is provided with a gas supply for building up the required heating atmosphere. In an oven the mixture is subjected to three heating operations, each time for 2 hours, at 1150° C in $N_2$, at 1400° C in $N_2$ and at 1450 in $N_2$ with 1% by volume of $H_2$. The product thus obtained is a luminescent material which satisfies the formula $Y_{1.80}Tb_{0.20}Al_4MgSiO_{12}$ and has, as shown by X-ray diffraction analyses, the garnet crystal structure. On excitation by ultra violet radiation (mainly 254 nm) this garnet furnishes a luminous flux which is 203.0% relative to a standard. The absorption of the exciting radiation is 75.0%. By way of comparison, the luminous flux of the prior-art garnet according to the formula $Y_{2.85}Tb_{0.15}Al_5O_{12}$ amounts to only 8.2%, the absorption of the exciting radiation being 44.2%. The standard which is used here and in the subsequent examples for the luminous flux measurements is a calcium-halophosphate activated by antimony and manganese, which is mixed with non-luminescent calcium carbonate in such quantities that the luminous flux is reduced to approximately 50%.

FIG. 2 shows the excitation spectrum of the garnet obtained in the above-described manner. In this Figure (the wave length of) the exciting radiation is plotted in nm on the horizontal axis. The relative luminous flux LOrel. is plotted on the vertical axis. It appears from the graph (curve 1) that the excitation spectrum has a relatively wide band in the range from 250 - 300 nm, so that the material can be properly excited by the 254 nm resonant radiation of mercury. FIG. 2 also shows the excitation spectrum of the priorart garnet mentioned in the above example (dotted curve 2). It can be clearly seen that the important excitation band of the prior-art garnet is very narrow and that the material is not suitable for practical use in low pressure mercury vapour discharge lamps.

FIG. 3 shows the emission spectrum of the garnet according to the invention prepared in accordance with example 1. The spectrum consists of the characteristic Tb emission. In FIG. 3 the wavelength $\lambda$ (in nm) is plotted on the horizontal axis and the emitted radient energy E per constant wavelength interval (in arbitrary units) is plotted on the vertical axis.

When preparing the luminescent garnets according to the invention so-called melting salts which promote the forming reaction and/or reduce the forming temperature can be used to advantage. Suitable melting salts include boric acid or $B_2O_3$ and, in particular, halides such as ammonium chloride and -fluoride, magnesium chloride, yttrium chloride and aluminiumfluoride.

EXAMPLE 2

A mixture is made of the materials mentioned in example 1 in the quantities indicated there, with this exception that as melting salt 10 mole % magnesium as $MgCl_2.6H_2O$ is added in excess. The mixture is heated twice, each time for 2 hours, at 1350° C in $N_2$ and at 1300° C in $N_2$. The product obtained is of the same formula as the material obtained in example 1 and has a luminous flux which is approximately 10% larger than that of the material of example 1.

EXAMPLE 3

When preparing the luminescent garnets according to the invention it is also possible to start with much advantage from co- recipitated hydroxides. Solutions of $Y_2O_3$ and $Tb_4O_7$ in $HNO_3$ are prepared for this purpose. The nitrates of Mg and Al are added to these solutions. Thereafter the required quantity of $SiO_2$ is dispersed in the liquid and thereafter ammonia is added until a pH of 10–11 has been achieved. The precipitate then obtained is evaporated to dryness or filtered off. A precipitate obtained in this manner comprising component elements which satisfy the formula $Y_{1.8}Tb_{0.2}Al_4MgSiO_{12}$ is heated for 2 hours at 700° C in air in an open sintered alumina crucible. Thereafter the product is heated twice, each time for 2 hours, namely at 1350° C in $N_2$ and at 1300° C in $N_2$. The product obtained has, when excited at 254 nm a luminous flux of 180.7%.

The following tables 1 to 6 inclusive show the composition and also the results of luminous flux and absorption measurements of a large number of luminescent garnets according to the invention. The luminent flux (LO) is stated in % relative to the above-mentioned standard. The absorption (A) of the 254 nm radiation is stated in %. The materials included in the tables were all prepared in a manner analogous to example 1. The column "preparation" specifies the firing conditions (temperature, atmosphere) for each material in the table. Each heating operation lasts 2 hours.

TABLE 1

| Example | composition | preparation | LO | A |
|---|---|---|---|---|
| 1 | $Y_{1.96}Tb_{0.04}Al_4MgSiO_{12}$ | 1) | 133.6 | 52.1 |
| 2 | $Y_{1.90}Tb_{0.10}Al_4MgSiO_{12}$ | 1) | 173.2 | 65.2 |
| 3 | $Y_{1.80}Tb_{0.20}Al_4MgSiO_{12}$ | 1) | 203.0 | 75.0 |
| 4 | $Y_{1.60}Tb_{0.40}Al_4MgSiO_{12}$ | 1) | 208.4 | 80.6 |
| 5 | $Y_{1.20}Tb_{0.80}Al_4MgSiO_{12}$ | 1) | 165.6 | 85.7 |
| 6 | $YTbAl_4MgSiO_{12}$ | 2) | 118.3 | 87.5 |

1) 3 heating operations : at 1150° C in $N_2$, at 1400° C in $N_2$, at 1450° C in $N_2$ with 1% by volume of $H_2$.
2) 2 heating operations : at 1350° C in $N_2$, at 1300° C in $N_2$.

TABLE 2

| Ex. | composition | preparation | LO | A |
|---|---|---|---|---|
| 7 | $Y_{2.25}Tb_{0.25}Al_{4.50}Mg_{0.50}Si_{0.50}O_{12}$ | 3) | 95.6 | 56.4 |
| 8 | $Y_{2.025}Tb_{0.225}Al_{4.25}Mg_{0.75}Si_{0.75}O_{1}$ | 4) | 173.1 | 67.8 |
| 9 | $Y_{1.80}Tb_{0.20}Al_{3.50}Mg_{1.25}Si_{1.25}O_{12}$ | 5) | 190.3 | 74.8 |
| 10 | $Y_{1.80}Tb_{0.20}Al_{3.0}Mg_{1.5}Si_{1.5}O_{12}$ | 5) | 186.8 | 73.0 |
| 11 | $Y_{1.80}Tb_{0.20}Al_{2.5}Mg_{1.75}Si_{1.75}O_{12}$ | 5) | 184.3 | 70.2 |
| 12 | $Y_{1.80}Tb_{0.20}Al_{2.0}Mg_{2.0}Si_{2.0}O_{12}$ | 5) | 165.2 | 67.5 |
| 13 | $Y_{1.80}Tb_{0.20}Al_{1.5}Mg_{2.25}Si_{2.25}O_{12}$ | 6) | 155.0 | 69.9 |

TABLE 2-continued

| Ex. | composition | preparation | LO | A |
|---|---|---|---|---|
| 14 | $Y_{1.80}Tb_{0.20}AlMg_{2.5}Si_{2.5}O_{12}$ | 6) | 132.9 | 64.0 |

3) 6 heating operations : at 1250° C and at 1350° C each time in $N_2$ with 1% by volume of $H_2$, and at 1400° C, 1450° C, 1500° C and 1550° C each time in $N_2$.
4) 5 heating operations : see 3) but excluding the last heating operation.
5) 3 heating operations : at 1250° C in $N_2$ with 1 % by volume of $H_2$, at 1350° C in $N_2$, at 1400° C in $N_2$ with 1% by volume of $H_2$.
6) 4 heating operations : at 1150° C, 1300° C, 1350° C and 1400° C each time in $N_2$.

TABLE 3

| Ex. | Composition | Preparation | LO | A |
|---|---|---|---|---|
| 15 | $Y_{1.80}Tb_{0.20}Al_{3.80}Ga_{0.20}MgSiO_{12}$ | 7) | 176.2 | 73.4 |
| 16 | $Y_{1.80}Tb_{0.20}Al_{3.60}Ga_{0.40}MgSiO_{12}$ | 7) | 182.1 | 74.7 |
| 17 | $Y_{1.80}Tb_{0.20}Al_{3.20}Ga_{0.80}MgSiO_{12}$ | 8) | 183.0 | 72.1 |
| 18 | $Y_{1.80}Tb_{0.20}Al_{2.0}Ga_{2.0}MgSiO_{12}$ | 8) | 164.8 | 78.3 |
| 19 | $Y_{1.80}Tb_{0.20}Ga_4MgSiO_{12}$ | 8) | 78.4 | 84.8 |
| 20 | $Y_{1.80}Tb_{0.20}Al_3ScMgSiO_{12}$ | 9) | 174.9 | 75.1 |

7) 5 heating operations : at 1150° C, 1300° C, 1350° C, 1400° C and 1450° C, each time in $N_2$.
8) 4 heating operations : see 7) omitting the last heating operation.
9) 3 heating operations : twice at 1350° C in air and at 1400° C in $N_2$. The firing mixture contained 0.1 mole $H_3BO_3$ as melting salt.

TABLE 4

| Ex. | Composition | Preparation | LO | A |
|---|---|---|---|---|
| 21 | $Y_{1.80}Tb_{0.20}Al_{4.0}Mg_{0.75}Ca_{0.25}SiO_{12}$ | 10) | 180.6 | 74.8 |
| 22 | $Y_{1.80}Tb_{0.20}Al_{4.0}Mg_{0.5}Ca_{0.5}SiO_{12}$ | 10) | 142.2 | 62.6 |
| 23 | $Y_{1.80}Tb_{0.20}Al_{4.0}Mg_{0.25}Ca_{0.75}SiO_{12}$ | 10) | 128.2 | 59.7 |
| 24 | $Y_{1.80}Tb_{0.20}Al_{4.0}CaSiO_{12}$ | 11) | 105.3 | 54.6 |
| 25 | $Y_{1.85}Tb_{0.15}Al_{4.0}SrSiO_{12}$ | 12) | 56.2 | 50.2 |
| 26 | $Y_{1.80}Tb_{0.20}Al_{4.0}ZnSiO_{12}$ | 13) | 127.0 | 68.4 |

10) 4 heating operations : at 1150° C in air, twice at 1350° C in $N_2$, at 1400° C in $N_2$. The firing mixture contained 0.1 mole $MgCl_2$ as melting salt.
11) 4 heating operations : see 10). 0.1 mole $CaCl_2$ was used as melting salt.
12) 4 heating operations : at 1150° C in $N_2$ with 2% by volume of $H_2$, at 1300° C, at 1400° C and at 1500° C each time in $N_2$.
13) 5 heating operations : at 1150° C in air, at 1350° C, at 1375° C, at 1400° C and at 1450° C each time in $N_2$.

TABLE 5

| Ex. | Composition | Preparation | LO | A |
|---|---|---|---|---|
| 27 | $Y_{1.5}Gd_{0.3}Tb_{0.2}Al_4MgSiO_{12}$ | 14) | 177.1 | 71.9 |
| 28 | $Y_{1.25}Gd_{0.55}Tb_{0.20}Al_4MgSiO_{12}$ | 14) | 151.6 | 67.3 |
| 29 | $YGd_{0.8}Tb_{0.2}Al_4MgSiO_{12}$ | 14) | 138.0 | 65.6 |
| 30 | $Y_{0.8}LuTb_{0.2}Al_4MgSiO_{12}$ | 15) | 141.9 | 58.4 |

14) 3 heating operations : at 1150° C in air, twice at 1350° C in $N_2$. The firing mixture contained 0.1 mole $MgCl_2$ as melting salt.
15) 3 heating operations : at 1375° C and twice at 1350° C, each time in $N_2$. 0.1 mole $MgCl_2$ was used as melting salt.

TABLE 6

| Ex. | Composition | Preparation | LO | A |
|---|---|---|---|---|
| 31 | $Y_{1.8}Tb_{0.2}Al_4MgSi_{0.9}Ge_{0.1}O_{12}$ | 16) | 155.0 | 70.6 |
| 32 | $Y_{1.8}Tb_{0.2}Al_4MgSi_{0.8}Ge_{0.2}O_{12}$ | 16) | 148.2 | 70.7 |
| 33 | $Y_{1.8}Tb_{0.2}Al_4MgSi_{0.6}Ge_{0.4}O_{12}$ | 16) | 135.0 | 72.3 |
| 34 | $Y_{1.8}Tb_{0.2}Al_4MgGeO_{12}$ | 16) | 73.0 | 58.0 |
| 35 | $Y_{1.8}Tb_{0.2}Al_{3.8}Mg_{1.1}SiZr_{0.1}O_{12}$ | 17) | 155.6 | 76.8 |
| 36 | $Y_{1.8}Tb_{0.2}Al_{3.6}Mg_{1.2}SiZr_{0.2}O_{12}$ | 17) | 124.1 | 67.8 |
| 37 | $Y_{1.8}Tb_{0.2}Al_3Mg_{1.5}SiZr_{0.5}O_{12}$ | 17) | 63.0 | 56.4 |
| 38 | $Y_{1.8}Tb_{0.2}Al_4CaZrO_{12}$ | 17) | 55.5 | 59.7 |

16) 3 heating operations : at 1300° C, 1350° C and 1400° C each time in $N_2$. The firing mixture contained 0.1 mole $MgCl_2$ as melting salt.
17) 4 heating operations : twice at 1350° C in $N_2$, at 1375° C in $N_2$  with 2 % by volume of $H_2$. 0.1 mole $MgCl_2$ was used as melting salt.

What is claimed is:

1. A terbium-activated luminescent material with garnet crystal structure, characterized in that the luminescent material satisfies the formula $$Ln_{3-x-p}Tb_p A_{5-x-2y} Me^{II}_{x+y} Me^{IV}_{x+y} O_{12},$$

wherein Ln represents at least one of the elements yttrium, gadolinium and lutecium, A is at least one of the elements aluminium and gallium, wherein upto 40 mole % of A is replaceable by scandium, $Me^{II}$ is at least one of the elements magnesium, calcium, strontium and zinc, and $Me^{IV}$ is at least one of the elements silicon, germanium and zirconium and wherein $$0 \leq x \leq 2.8$$
$$0 \leq y \leq 2.0$$
$$0.4 \leq x+y \leq 2.8$$
$$0.02 \leq p \leq 1.50$$
$$x+p \leq 3.0$$

2. A luminescent material as claimed in claim 1, characterized in that Ln is mainly yttrium.

3. A luminescent material as claimed in claim 2, characterized in that A is mainly aluminium.

4. A luminescent material as claimed in claim 2, characterized in that $Me^{II}$ is mainly magnesium.

5. A luminescent material as claimed in claim 2, characterized in that $Me^{IV}$ is mainly silicon.

6. A luminescent material as claimed in claim 1 characterized in that $$0.5 \leq x \leq 1.7$$
$$0 \leq y \leq 1.5$$
$$x+y \leq 2.25$$
$$0.05 \leq p \leq 0.75.$$

7. A luminescent material as claimed in claim 6, characterized in that $$0.75 \leq x \leq 1.25$$
$$0 \leq y \leq 0.75$$
$$x+y \leq 1.75$$
$$0.10 \leq p \leq 0.50$$

8. A low-pressure mercury vapor discharge lamp provided with a luminescent material as claimed in claim 1.

* * * * *